United States Patent
Murakami et al.

(10) Patent No.: US 9,266,086 B2
(45) Date of Patent: Feb. 23, 2016

(54) COATED PARTICLES, METHOD OF PRODUCING COATED PARTICLES AND ADSORPTION APPARATUS

(75) Inventors: Yukiko Murakami, Saitama (JP); Shingo Rikimura, Kanagawa (JP); Tsuneo Okuyama, Kanagawa (JP)

(73) Assignees: HOYA CORPORATION, Tokyo (JP); Tsuneo Okuyama, Kanagawa (JP)

( * ) Notice: Subject to any disclaimer, the term of this patent is extended or adjusted under 35 U.S.C. 154(b) by 727 days.

(21) Appl. No.: 12/988,049

(22) PCT Filed: Apr. 6, 2009

(86) PCT No.: PCT/JP2009/057082
§ 371 (c)(1),
(2), (4) Date: Jan. 5, 2011

(87) PCT Pub. No.: WO2009/128358
PCT Pub. Date: Oct. 22, 2009

(65) Prior Publication Data
US 2011/0111953 A1  May 12, 2011

(30) Foreign Application Priority Data

Apr. 18, 2008 (JP) ................. 2008-109616

(51) Int. Cl.
*B01J 20/26* (2006.01)
*B01J 20/32* (2006.01)
*B01J 20/04* (2006.01)

(52) U.S. Cl.
CPC ............ *B01J 20/048* (2013.01); *B01J 20/3204* (2013.01); *B01J 20/3242* (2013.01); *B01J 20/3272* (2013.01); *B01J 20/3293* (2013.01)

(58) Field of Classification Search
None
See application file for complete search history.

(56) References Cited

U.S. PATENT DOCUMENTS

| | | | | |
|---|---|---|---|---|
| 4,245,005 A | * | 1/1981 | Regnier et al. | 428/420 |
| 5,039,408 A | * | 8/1991 | Ichitsuka et al. | 210/198.2 |
| 5,171,440 A | * | 12/1992 | Kawamura | 210/198.2 |
| 5,389,449 A | | 2/1995 | Afeyan et al. | |
| 5,914,044 A | * | 6/1999 | Lindoy et al. | 210/670 |
| 7,740,820 B2 | | 6/2010 | Ishikawa et al. | |
| 2002/0099104 A1 | | 7/2002 | Muranaka et al. | |
| 2002/0134729 A1 | * | 9/2002 | Muranaka et al. | 210/656 |
| 2004/0238138 A1 | * | 12/2004 | Ishizaki et al. | 162/164.6 |
| 2006/0041058 A1 | * | 2/2006 | Yin et al. | 525/50 |
| 2007/0259775 A1 | | 11/2007 | Burch et al. | |
| 2009/0060814 A1 | | 3/2009 | Ishikawa et al. | |
| 2009/0087369 A1 | | 4/2009 | Ishikawa et al. | |
| 2010/0130353 A1 | | 5/2010 | Ishikawa et al. | |
| 2010/0255306 A1 | | 10/2010 | Ishikawa et al. | |

FOREIGN PATENT DOCUMENTS

| | | |
|---|---|---|
| JP | 6-504482 | 5/1994 |
| JP | 2002-219367 | 8/2002 |
| JP | 2005-140787 | 6/2005 |

* cited by examiner

*Primary Examiner* — Alexandre Ferre
(74) *Attorney, Agent, or Firm* — Greenblum & Bernstein, P.L.C.

(57) ABSTRACT

Coated particles according to the present invention are comprised of particles each having a surface. At least the vicinity of the surface of the particle is constituted of a calcium phosphate-based compound. The particles are coated with a polyamine-based compound, and an average particle size of the particles is 1 μm or more. Furthermore, such coated particles are produced by preparing a preparation liquid containing a liquid containing at least one of water and an alcohol, the coated particles and the polyamine-based compound and then heating the preparation liquid to coat the particles with the polyamine-based compound. Furthermore, it is preferred that the liquid used in preparing the preparation liquid contains methanol as a main component thereto.

16 Claims, 8 Drawing Sheets

COATED PARTICLES, METHOD OF PRODUCING COATED PARTICLES AND ADSORPTION APPARATUS

TECHNICAL FIELD

The present invention relates to coated particles, a method of producing coated particles and an adsorption apparatus.

RELATED ART

A calcium phosphate-based compound has a chemical structure in which calcium ions and phosphate groups are regularly arranged in a high density state. Such a calcium phosphate-based compound acts as an amphoteric ion exchange body and thus it has adsorption capability due to electrostatic interaction. Therefore, particles (calcium phosphate-based compound particles) constituted of the calcium phosphate-based compound is widely used as an adsorbent which is used for a column of separating biologically-relevant substances (materials) such as proteins, nucleotides, nucleic acids, cells, and the like (see, e.g., the following Patent Document).

In such calcium phosphate-based compound particles, for example, in the case where a protein is separated from a sample containing proteins, if the protein is an acid protein, carboxyl groups contained in a chemical structure of the acid protein make coordinate bonds with the calcium ions of the calcium phosphate-based compound particles, thereby adsorbing the acid protein by the calcium phosphate-based compound particles. On the other hand, if the protein is a basic protein, amino groups contained in a chemical structure of the basic protein make ion bonds with the phosphate groups of the calcium phosphate-based compound particles, thereby adsorbing the basic protein by the calcium phosphate-based compound particles. Therefore, the protein is separated from the sample containing the proteins based on differences in degrees of adsorbilities of the proteins to the calcium phosphate-based compound particles.

However, in the calcium phosphate-based compound particles, positive electric charge due to the calcium ions is lower than negative electric charge due to the phosphate groups. Therefore, the calcium phosphate-based compound particles have low adsorption capability of adsorbing a substance such as an acid protein having negative electric charge.

Therefore, in a column (adsorption apparatus) which is provided with the calcium phosphate-based compound particles as an adsorbent, there are the following problems: (I) a yielding (collection) ratio of an adsorbed substance having negative electric charge which is contained in a sample solution becomes low and (II) in the case where a plurality of adsorbed substances having negative electric charge are contained in a sample solution, the plurality of adsorbed substances are eluted almost simultaneously at a relatively early stage, so that sufficient separation capability cannot be obtained.

The Patent Document is U.S. Pat. No. 5,171,440 which is an example of a related art.

SUMMARY OF THE INVENTION

It is an object of the present invention to provide coated particles that have excellent adsorption capability and separation capability regardless of an electric charge state of an adsorbed substance. Furthermore, it is another object of the present invention to provide a method of producing such coated particles and an adsorption apparatus that uses such coated particles.

These objects are achieved by the present invention which is described below by the items (1) to (16).

(1) Coated particles comprise particles each having a surface, and at least the vicinity of the surface of the particle being constituted of a calcium phosphate-based compound. The particle is coated with a polyamine-based compound, and an average particle size of the particles is 1 μm or more.

According to the coated particles, it is possible to exhibit excellent adsorption capability and separation capability regardless of an electric charge state of an adsorbed substance.

(2) In the coated particles described in the above-mentioned item (1), the average particle size of the particles is in the range of 2 to 200 μm.

According to the coated particles, when the coated particles are used as an adsorbent for an adsorption apparatus, it is possible to reliably prevent a filter member of the adsorption apparatus from being clogging and a liquid from remaining in the adsorption apparatus. In addition, it is possible to ensure sufficient surface area to which the adsorbed substance is to be adsorbed.

(3) In the coated particles described in the above-mentioned item (1), the polyamine-based compound includes polyethylenimine.

Polyethylenimine includes one type in which ethylenimines are connected with each other in a liner fashion and the other type (branching polyethylenimine) in which ethylenimines are connected with each other in a branch fashion. In particular, if the branching polyethylenimine is used, the particles can be coated with polyethylenimine firmly.

(4) In the coated particles described in the above-mentioned item (3), an average molecular weight of the polyethylenimine is in the range of 800 to 100000.

According to the coated particles, it is possible to prevent the particles from being aggregated due to bonding between the polyethylenimine of one coated particle and the polyethylenimines of other coated particles. In addition, it is possible to reliably coat the particles with polyethylenimine.

(5) In the coated particles described in the above-mentioned item (3), a coating amount of the polyethylenimine is in the range of 0.1 to 100 mg with respect to 1 g of the particle.

According to the coated particles, it is possible to prevent the particles from being aggregated due to bonding between the polyethylenimine of one coated particle and other polyethylenimines of other coated particles. In addition, it is possible to reliably increase the positive electric charge of the particles. In particular, it is possible to sufficiently improve the adsorption capability and separation capability with respect to the adsorbed substance having large negative electric charge.

(6) In the coated particles described in the above-mentioned item (1), the calcium phosphate-based compound is hydroxyapatite.

Hydroxyapatite has particularly low possibility that a biologically-relevant substance is damaged. Therefore, in the case where the biologically-relevant substance is used as an adsorbed substance to be adsorbed to the coated particles, the biologically-relevant substance can be adsorbed to be particles in a state that it is not altered and deteriorated.

(7) A method of producing coated particles comprised of particles each having a surface, and at least the vicinity of the surface of the particle being constituted of a calcium phosphate-based compound, wherein the particles are coated with a polyamine-based compound, and an average particle size of the particles is 1 μm or more, and the method comprising: preparing a preparation liquid containing a liquid containing at least one of water and an alcohol, the coated particles and the polyamine-based compound; heating the preparation liquid to coat the particles with the polyamine-based compound.

According to the method, it is possible to produce coated particles exhibiting excellent adsorption capability and separation capability with simple steps regardless of an electric charge state of an adsorbed substance.

(8) In the method described in the above-mentioned item (7), the preparing the preparation liquid includes: mixing the polyamine-based compound with the liquid to obtain a first mixture; and adding the particles into the first mixture to disperse the particles to obtain the preparation liquid.

According to the method, after the polyamine-based compound is dissolved in the liquid, the particles are dispersed in the liquid. As a result, it is possible to allow the polyamine-based compound to be in contact with the particles uniformly. Thus, it is possible to uniformly coat the particles with the polyamine-based compound.

(9) In the method described in the above-mentioned item (8), after the adding the particles into the first mixture, the preparing the preparation liquid further includes adding the liquid into the preparation liquid.

According to the method, since the dispersiblility of the particles is improved in the preparation liquid, it is possible to more uniformly coat the particles with the polyamine-based compound.

(10) In the method described in the above-mentioned item (7), the liquid contains methanol as a main component thereof.

This makes it possible to efficiently react the calcium phosphate-based compound and the polyamine-based compound. In other words, the phosphate groups included in the calcium phosphate-based compound can efficiently react with the amino groups included in the polyamine-based compound. As a result, it is possible to reliably improve a coating ratio of the particles with the polyamine-based compound.

(11) In the method described in the above-mentioned item (10), an amount of the methanol contained in the liquid is 50 wt % or more.

This makes it possible to efficiently react the calcium phosphate-based compound with the polyamine-based compound. As a result, it is possible to reliably improve a coating ratio of the particles with the polyamine-based compound.

(12) In the method described in the above-mentioned item (7), the polyamine-based compound includes polyethylenimine.

Polyethylenimine includes one type in which ethylenimines are connected with each other in a liner fashion and the other type (branching polyethylenimine) in which ethylenimines are connected with each other in a branch fashion. In particular, if the branching polyethylenimine is used, the particles can be coated with the polyethylenimine firmly.

(13) In the method described in the above-mentioned item (12), a weight ratio between the particles and the polyethylenimine contained in the preparing liquid is in the range of 500:1 to 10:1.

According to the method, it is possible to prevent the particles from being aggregated due to bonding between polyethylenimine of one coated particle and other polyethylenimins of other coated particles. In addition, it is possible to coat the particles with polyethylenimine with a predetermined coating amount.

(14) In the method described in the above-mentioned item (7), the calcium phosphate-based compound is hydroxyapatite.

Hydroxyapatite has particularly low possibility that a biologically-relevant substance is damaged. Therefore, in the case where the biologically-relevant substance is used as the adsorbed substance to be adsorbed to the coated particles, it is possible to produce coated particles to which the biologically-relevant substance can be adsorbed in a state that it is not altered and deteriorated.

(15) In the method described in the above-mentioned item (7), a temperature of the preparing liquid in heating the preparing liquid is in the range of 40 to 100° C.

This makes it possible to efficiently react hydroxyapatite with polyethylenimine while preventing the preparing liquid from being suddenly boiled and a color of the preparing liquid from being changed. In addition, it is possible to coat the particles with polyethylenimine with a predetermined coating amount.

(16) An adsorption apparatus provided with the coated particles described in the above-mentioned item (1) as an adsorbent.

According to the adsorption apparatus, it is possible to exhibit excellent adsorption capability and separation capability regardless of an electric charge state of an adsorbed substance contained in the sample solution.

DETAILED DESCRIPTION OF THE PREFERRED EMBODIMENTS

Hereinbelow, coated particles, a method of producing coated particles and an adsorption apparatus according to the present invention will be described in detail with reference to preferred embodiments shown in the accompanying drawings.

<Coated Particles>

First, the coated particles according to the present invention will be described.

The coated particles according to the present invention serve as an adsorbent. Materials (adsorbed substances or substances) including a biologically-relevant substance such as proteins, nucleotides, nucleic acids, cells, and the like are adsorbed to surfaces of the coated particles. Such coated particles are used as a filler (adsorbent) for a column of separating various kinds of adsorbed substances contained in a sample solution in a state that the coated particles are filled in the column an adsorption apparatus provides with.

In this case, the sample solution containing the various kinds of adsorbed substances is supplied into the column and passes through the column, so that the adsorbed substances contained in the sample solution adsorb to the coated particles. After that, if an eluante is supplied into the column and passes through the column, the adsorbed substances adsorbing to the coated particles are eluted at elution times based on differences in degrees of adsorbabilities of the adsorbed substances to the coated particles and in degrees of affinities of the adsorbed substances to the eluante. Therefore, if the eluante which has passed through the column is fractionated to the different portions (fractions) every a predetermined time as an eluate, the adsorbed substances are separated from each other in the fractions.

The coated particles according to the present invention which are used as such an adsorbent have the following features. A first feature is that particles which are constituted of at least the calcium phosphate-based compound (hereinafter, simply referred to as "particles") are coated with a polyamine-based compound. A second feature is that an average particle size of the particles is 1 µm or more.

The particles are parts constituting a core of the coated particles. As mentioned above, at least the vicinity of the surfaces of the particles is mainly constituted of the calcium phosphate-based compound.

The calcium phosphate-based compound is represented by a chemical formula: $Ca_{10}(PO_4)_3X_2$. A Ca/P ratio of the calcium phosphate-based compound is in the range of 1.0 to 2.0. The calcium phosphate-based compound has a structure that calcium ions and phosphate groups are regularly arranged with a high density state. Furthermore, the calcium phosphate-based compound has adsorption capability due to electrostatic interaction as an amphoteric ion exchange body. Therefore, the particles, of which at least the vicinity of the surfaces is constituted of mainly the calcium phosphate-based compound, have superior adsorption capability with respect to various kinds of substances (in particular, substances having positive electric charge). In addition, the particles are reliably used as the core of the adsorbent which serves so that the various kinds of adsorbed substances such as the biologically-relevant substance and the like are adsorbed to the surfaces of the particles thereof.

Examples of the calcium phosphate-based compound include hydroxyapatite $(Ca_{10}(PO_4)_6(OH)_2)$, fluoroapatite $(Ca_{10}(PO_4)_6F_2)$, chloroapatite $(Ca_{10}(PO_4)_6Cl_2)$ carbonate fluoroapatite $(Ca_{10}(PO_4, CO_3)_6F_2)$, carbonate hydroxyatite $(Ca_{10}(PO_4, CO_3)_6(OH)_2)$ and the like. These compounds can be used singly or in combination of two or more of them.

Among them, it is preferred that the calcium phosphate-based compound is constituted of hydroxyapatite $(Ca_{10}(PO_4)_6(OH)_2)$ as a main component thereof. Since hydroxyapatite has superior affinity with respect to the biologically-relevant substance, it is widely used as a biomaterial. Therefore, in the case where the biologically-relevant substance is used as the adsorbed substance, the adsorbed substance is adsorbed to the coated particles with great efficiency. Furthermore, since there is very a low possibility that hydroxyapatite damages the biologically-relevant substance, it is possible to adsorb the biologically-relevant substance (adsorbed substance) to the coated particles without altering and degrading it.

In this regard, the calcium phosphate-based compound can be synthesized by a wet synthesis method, a dry synthesis method and the like which are well-known. In this case, materials (raw material) remaining in synthesizing the calcium phosphate-based compound or secondary reaction products obtained in synthetic processes thereof may be contained in the calcium phosphate-based compound.

Figure 1:
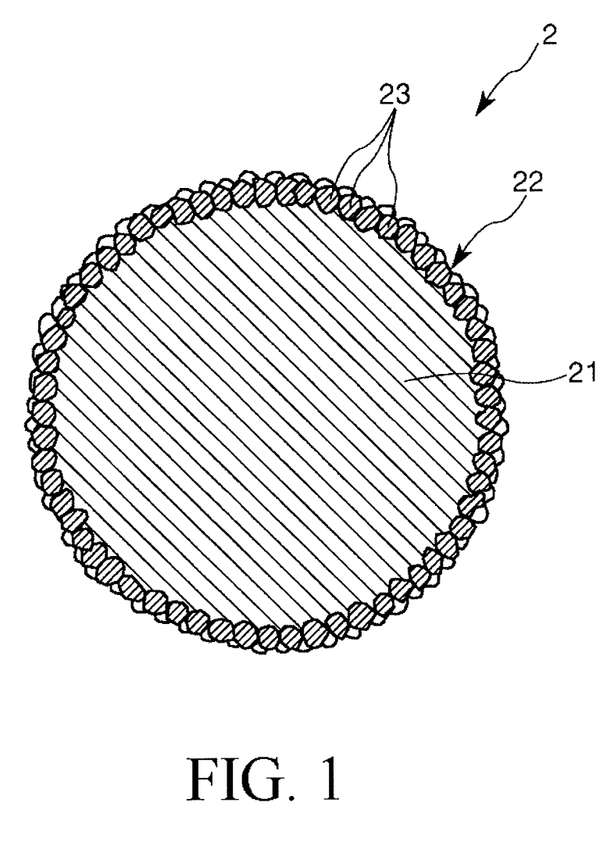
FIG. 1 is a section view showing one example of coated particles of the present invention.

The whole of the particles may be constituted of the calcium phosphate-based compound. As shown in FIG. 1, each of the particles may be a particle 2 that a particulate base material 21 constituted of a resin material and the like is coated with a calcium phosphate-based compound layer 22 constituted of mainly the calcium phosphate-based compound. The particle 2 as shown in FIG. 1 makes it possible to easily adjust a shape, size (average particle size and the like), property (density and the like) and the like.

Examples of the resin material constituting the base material 21 include various kinds of thermo-setting resins and various kinds of thermoplastic resins. Specifically, examples of the thermoplastic resins include polyamide (e.g. nylon 6, nylon 6,6, nylon 6,10, nylon 12), polyethylene, polypropylene, polystyrene, polyimide, an acryl resin, a thermoplastic polyurethane and the like. Examples of the thermo-setting resins include an epoxy resin, a phenol resin, a melamine resin, an urea resin, an unsaturated polyester, an alkyd resin, a thermo-setting polyurethane, an ebonite and the like. These resins may be used singly or in combination of two or more of them.

As shown in FIG. 1, it is preferred that the calcium phosphate-based compound layer 22 is formed by embedding a part of fine particles 23 constituted of mainly the calcium phosphate-based compound (hereinafter, simply referred to as "fine particles 23") to the vicinity of the surface of the base material 21. This makes it possible to exhibit superior adhesion property between the calcium phosphate-based compound layer 22 and the base material 21. Therefore, it is possible to reliably prevent the calcium phosphate-based compound layer 22 from being peeled off from the surface of the base material 21. In other words, it is possible to improve strengths of both the particles and the coated particles.

In this case, the calcium phosphate-based compound layer 22 can be formed by impacting porous particles mainly constituted of the calcium phosphate-based compound to the surface of the base material 21. According to such a method, it is possible to reliably form the calcium phosphate-based compound layer 22 with ease.

Such particles having the above configuration are coated with a polyamine-based compound.

If the particles are coated with the polyamine-based compound, a part of amino groups included in the polyamine-based compound is bonded to the phosphate groups which are exposed to the surface of the particles. This is because the amino groups have positive electric charge. As a result, groups of the polyamine-based compound other than the amino groups are exposed to the surfaces of the coated particles. Therefore, the coated particles have not only the positive electric charge due to the calcium ions but also the positive electric charge due to the amino groups. Consequently, it is possible to improve the adsorption capability with respect to a substance (adsorbed substance) such as an acid protein and nucleotide having the negative electric charge.

Furthermore, by changing a coating amount of polyethylenimine, it is possible to control an electric charge state of the coated particles. Therefore, it is possible to adjust the electric charge state of the coated particles so as to be able to obtain optimum adsorptive property with respect to a target adsorbed substance, depending on an electric charge state of the target adsorbed substance. As a result, it is possible to obtain more superior adsorption capability and separation capability with respect to the various kinds of adsorbed substances each having a different electric charge state.

Examples of the polyamine-based compound include polyethylenimine, polylysine and the like. Among them, in particular, polyethylenimine is preferable.

This polyethylenimine is a polymer of ethylenimine represented by the following chemical formula (1).

Chemical formula (1)

Such polyethylenimine has chemical formulae of two types. One type is that ethylenimines are connected with each other in a liner manner, which is represented by the following chemical formula (2). The other type is that ethylenimines are connected with each other in a branching manner, which is represented by the following chemical formula (3). In the present invention, the other type is preferable as polyethylenimine.

Chemical formula (2)

where "m" is an integer of 2 or more.

Chemical formula (3)

where "n" is an integer of 1 or more.

The polyethylenimine of the other type that ethylenimines are connected with each other in the branching manner has a network structure as shown in the above chemical formula (3). Therefore, when the particles are coated with it, the particles are firmly coated with the polyethylenimine. Furthermore, when the amino groups are bonded to the phosphate groups exposed to the surfaces of the particles, the calcium ions can be exposed from the network structure (to the surfaces of the particles) without coating the calcium ions which are exposed to the surfaces of the particles. As a result, the coated particles can reliably improve the adsorption capability with respect to the substance having the negative electric charge.

In this regard, the polyamine-based compound may include a polyethylenimine derivative that at least a part of hydrogen atoms included in the polyethylenimine is replaced by other elements (atoms) or atomic groups in addition to the compounds as described above.

An average molecular weight of the polyethylenimine is preferably in the range of about 800 to 100000, and more preferably in the range of about 5000 to 10000. If the average molecular weight is too low, it is difficult to reliably coat the particles with the polyethylenimine, so that there is a fear that it is difficult to obtain a predetermined electric state of the coated particles. On the other hand, if the average molecular weight exceeds the upper limit of the above range, aggregates of the particles are made by adhering among the polyethylenimines coating the particles, so that there is a fear that it is difficult to obtain the coated particles having a large specific surface area.

An coating amount of the polyethylenimine is preferably in the range of about 0.1 to 100 mg, more preferably in the range of about 0.5 to 50 mg, and even more preferably in the range of about 0.5 to 15 mg with respect to 1 g of the particles. If the coating amount of the polyethylenimine is low, it is difficult to obtain a sufficient effect that the positive electric charge are increased in the coated particles, so that there is a fear that it is difficult to obtain sufficient adsorption capability with respect to the adsorbed substance having particularly large negative electric charge. On the other hand, if the coating amount of the polyethylenimine is large, the aggregates of the particles are made by adhering among the polyethylenimines coating the particles, so that there is a fear that it is difficult to obtain the coated particles having the large specific surface area.

In this regard, the coating amount of the polyethylenimine can be measured as follows:

First, the coated particles of 0.10 g and a 1N sodium hydroxide solution of 20 mL are mixed with each other in a container, and then the container is shaken for 15 seconds with Voltex. This shake is repeated for 3 hours to obtain a suspension liquid. By doing so, the polyethylenimine to coat the particles is dissolved in the sodium hydroxide solution.

Next, the suspension liquid is subjected to a centrifugal separation device to obtain a supernatant (stock solution). Thereafter, a part of the stock solution is diluted in a stepwise manner to prepare a plurality of diluted solution having different concentrations.

Next, each of the stock solution of 20 μL and diluted solutions of 20 μL is mixed with the CBB reagent (protein dying reagent) of 180 μL in a container, and then the container is left for 20 minutes to obtain a sample. Thereafter, each sample is subjected to an absorbance detector to obtain an absorbance at a wavelength of 630 nm. Then, a correlation diagram between dilution rates (concentrations of the diluted solutions) and the absorbances is made.

On the other hand, a polyethylenimine solution (standard solution) having a known concentration is prepared. In addition to that, the polyethylenimine solution is diluted in a stepwise manner to prepare a plurality of diluted solutions having different concentrations. Samples are prepared by using the CBB reagent in the same manner as the above process. Thereafter, each sample is subjected to the absorbance detector to obtain an absorbance at a wavelength of 630 nm. Then, a calibration curve which shows a relation between dilution rates (concentrations of the diluted solutions) and the absorbances is made.

Next, a ratio between the slope of the calibration curve and the slope of the correlation diagram of the sample is obtained. Then, an amount of polethylenimine contained in the stock solution and an amount of polethylenimine per 1 g of the coated particles are calculated based on the ratio.

Now, in the present invention, the average particle size of the particles is 1 µm or more in the coated particles having the configuration as described above.

Figure 3:
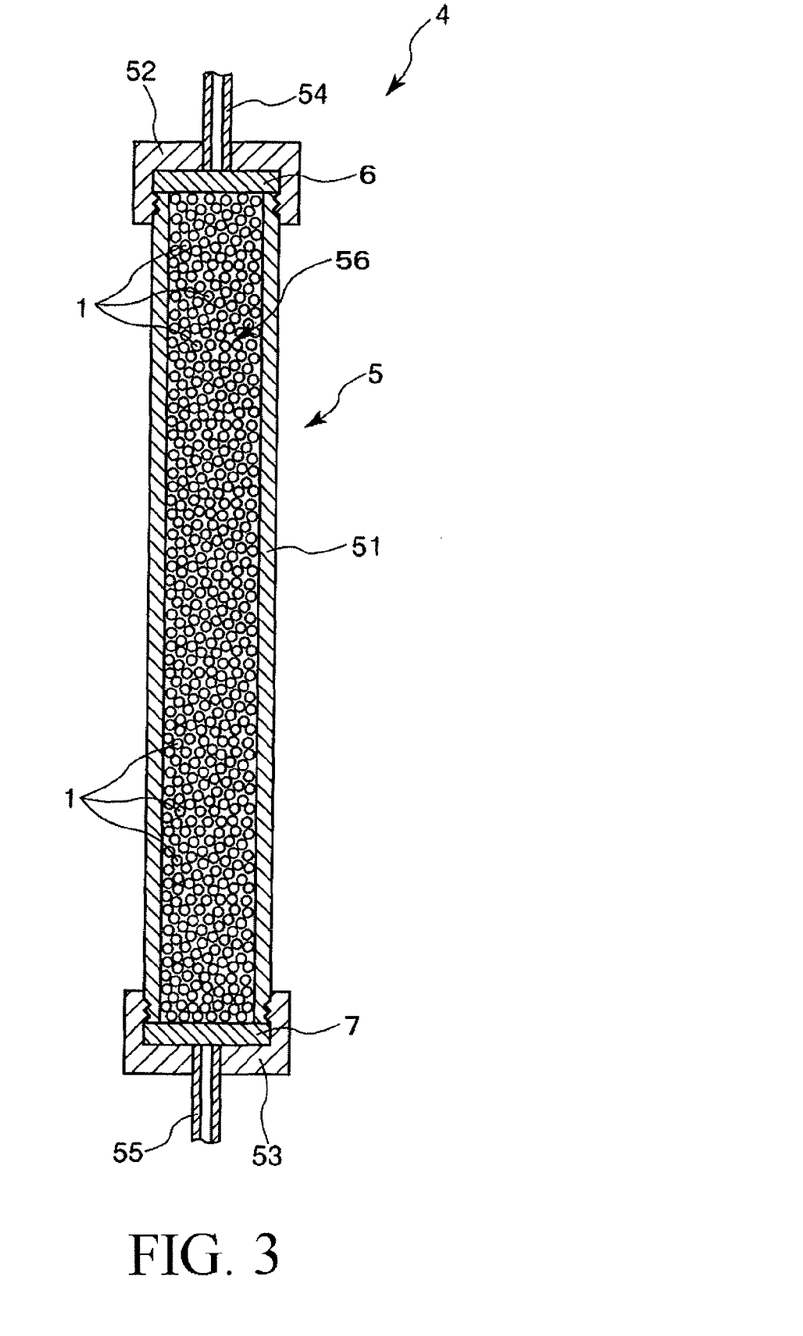
FIG. 3 is a sectional view showing one example of an adsorption apparatus to which coated particles of the present invention are used.

If the average particle size of the particles is 1 µm or more, it is possible to reliably prevent clogging from being generated to filter members 6 and 7 when the coated particles in which the particles are coated with the polyamine-based compound are used as the adsorbent provided with the adsorption apparatus 4 described later. Furthermore, it is possible to prevent a liquid from easily flowing between the coated particles and from remaining in the adsorption apparatus 4. As a result, the coated particles exhibit superior separation capability.

Generally, in particles, there is shown a tendency that an amount of the calcium ions exposed to the surfaces of the particles becomes lower than an amount of the phosphate groups of exposed to the surfaces of the particles. In other words, there is shown a tendency that the positive electrical charge due to the calcium ions become lower than the negative electrical charge due to the phosphate groups. Such a tendency is seen in a case that a particle size of the particles is set to relatively a large size such as 1 µm or more.

As described above, the particles are coated with the polyamine-based compound. By doing so, if the coated particles have the positive electrical charge due to the amino groups in addition to the positive electrical charge due to the calcium ions, it is possible to expose the negative electrical charge and the positive electrical charge in a balanced manner on the surfaces of the coated particles. As a result, the coated particles exhibit superior adsorption capability with respect to both a substance having the negative electrical charge and a substance having the positive electrical charge.

The average particle size of the particles may be 1 µm or more, is preferably in the range of about 2 to 200 µm, and more preferably in the range of about 2 to 80 µm. This makes it possible to reliably prevent the clogging from being generated to the filter members 6 and 7 and the liquid from remaining in the adsorption apparatus 4. In addition, it is possible to ensure sufficient surface area of the coated particles to adsorb the adsorbed substance. Accordingly, the adsorption apparatus 4, which uses the coated particles having the average particle size within the above ranges, exhibits more superior adsorption capability and separation capability.

<Method of Producing Coated Particles>

Next, a description will be made on a method of producing the coated particles according to the present invention, which produces the coated particles as described above.

In this embodiment, a description will be made on one example of a case of producing the coated particles that the whole particles constituted of hydroxyapatite are coated with polyethylenimine. Furthermore, such a case is a case that the whole particles constituted of hydroxyapatite are produced by using a wet synthesis method.

[S1: Step of Obtaining Slurry Containing Aggregates of Hydroxyapatite]

In this step, a calcium hydroxide dispersion liquid containing calcium hydroxide (first raw material) is mixed with a phosphoric acid aqueous solution containing phosphoric acid (second raw material) to obtain a mixture. Then, calcium hydroxide and phosphoric acid are reacted with stirring the mixture to obtain a slurry containing aggregates of hydroxyapatite.

To be concrete, the phosphoric acid aqueous solution is dropped into the calcium hydroxide dispersion liquid while the calcium hydroxide dispersion liquid is stirred. By doing so, the calcium hydroxide dispersion liquid and the phosphoric acid aqueous solution are mixed with each other to obtain the mixture.

In this embodiment, used is a wet synthesis method that phosphoric acid is used as a aqueous solution. This makes it possible to efficiently and easily synthesize hydroxyapatite (synthetic material) without using an expensive production facility.

In the present invention, at least one of the first raw material and the second raw material may be used as a solution, and both of them may be used as the solution.

Further, by performing this reaction with stirring, it is possible to efficiently perform the reaction between calcium hydroxide and phosphoric acid. In other words, it is possible to improve efficiency of the reaction therebetween.

[S2: Step of Obtaining Hydroxyapatite Powder by Drying Slurry]

In the step, powder is obtained by drying the slurry obtained in the step [S1].

In this regard, a spray drying method is preferably used as a method of drying the slurry. Accordingly to such a method, it is possible to reliably obtain powder of the particles having a predetermined particle size for a short period of time.

By completing the steps as described above, it is possible to obtain particles (hydroxyapatite particles) of hydroxyapatite (synthetic material).

[S3: Step of Coating Hydroxyapatite Particles with Polyethylenimine]

In the step, a particles-polyethylenimine reaction solution (preparing solution) is prepared by mixing the hydrorxyapatite particles obtained in the step [S2], polyethylenimine, and a solvent (liquid). Thereafter, the hydroxyapatite particles are coated with the polyethylenimine by heating the reaction solution.

Here, a method of preparing the particles-polyethylenimine reaction solution, namely a method of mixing the hydroxyapatite particles, the polyethylenimine, and the solvent is not particularly limited to a specific method. Examples of such a method include: (I) a method of simultaneously adding the hydroxyapatite particles and the polyethylenimine to the solvent; (II) a method of adding the hydroxyapatite particles to the solvent and then further adding the polyethylenimine to them; and (III) a method of adding the polyethylenimine to the solvent and then further adding the hydroxyapatite particles to them. Among them, the method (III) is preferable. The method (III) makes it possible to uniformly coat the particles of the coated particles with the polyethylenimine. This is because after the polyethylenimine is dissolved in the solvent, the hydroxyapatite particles are dispersed in the solvent, so that the polyethylenimine is in contact with the hydroxylapateite particles uniformly.

Hereinafter, a description will be made on the method (III) as representative in detail.

First, the polyethylenimine and a solvent including at least one of water and an alcohol (hereinafter, simply referred to as "solvent (liquid)") are mixed to each other to prepare a polyethylenimine solution.

Thereafter, the hydroxyapatite particles are added into the polyethylenimine solution to obtain a mixture and the mixture is mixed. Next, if needed, the solvent (liquid) is added to the mixture and they are mixed to obtain a particles-polyethylenimine reaction solution (preparing solution).

As described above, after the hydroxyapatite particles are added into the polyethylenimine solution, the liquid may be further added to the mixture. By doing so, dispersibility of the hydroxyapatite particles in the particles-polyethylenimine reaction solution is improved. Therefore, it is possible to uniformly coat the particles of the coated particles with the polyethylenimine.

Such a solvent (liquid) may include at least one of water and the alcohol. Concretely, examples of the solvent include water, the alcohol and a mixed solvent thereof.

Examples of such an alcohol include, but not particularly limited thereto, methanol, ethanol, isopropanol and the like. These alcohols may be used singly or in combination of two or more of them.

Among them, it is preferred, in particular, that the solvent contains methanol as a main component thereof. By using the solvent containing methanol as the main component thereof, it is possible to efficiently react hydroxyapatite and polyethylenimine. In other words, it is possible to efficiently proceed the reaction between the phosphate groups included in the hydroxyapatite and the amino groups included in the polyethylenimine. As a result, it is possible to reliably improve a ratio of coating the particles with the polyethylenimine (coating ratio).

In the case where a solvent containing methanol as the main component thereof is used as the solvent (liquid), an amount of methanol contained in the solvent is preferably 50 wt % or more, and more preferably in the range of about 65 to 85 wt %. This makes it possible to conspicuously exhibit effects obtained in the case where the solvent containing methanol as the main component thereof is used as the solvent.

Furthermore, it is possible to control the coating amount of the polyethylenimine with good accuracy, thereby reliably coating the particles with the polyethylenimine with a predetermined coating amount.

Furthermore, since it is possible to control an amount of using polyethylenimine which are required in order to obtain the predetermined coating amount, reduction of the substance cost is assisted.

A mixing ratio of the particles and polyethylenimine (ratio by weight) is slightly different depending on a kind of solvent, a specific surface area of the particles and the like. For example, in the case where the solvent containing methanol as the main component thereof is used as the solvent, the mixing ratio of the particles and polyethylenimine is preferably in the range of about 500:1 to 10:1, and more preferably in the range of about 100:1 to 50:1. If a mixing ratio of the polyethylenimine is too low, there is a fear that it becomes difficult to coat the particles with the polyethylenimine with the predetermined coating amount. On the other hand, if the mixing ratio of the polyethylenimine is too large, the aggregates of the particles are made by adhering among the polyethylenimines coating the particles, so that there is a fear that it becomes difficult to obtain the coated particles having a large specific surface area.

A heating temperature of the reaction solution is different depending on the kind of solvent. For example, in the case where the solvent containing methanol as the main component thereof is used as the solvent, the heating temperature is preferably in the range of about 40 to 100° C., and more preferably in the range of about 55 to 95° C. If heating temperature is too low, a reaction between the hydroxyapatite and polyethylenimine becomes insufficient, so that there is a fear that it becomes difficult to coat the particles with the polyethylenimine with the predetermined coating amount. On the other hand, if the heating temperature is too high, there is a fear that the reaction solution is boiled suddenly, which is dangerous.

In this case, a heating time of the reaction solution is preferably in the range of about 5 to 120 minutes, and more preferably in the range of about 15 to 60 minutes. If the heating time is too short, the reaction between the hydroxyapatite and polyethylenimine becomes insufficient, so that there is a fear that it becomes difficult to coat the particles with the polyethylenimine with the predetermined coating amount. On the other hand, if the heating time is too long, not only it is impossible to obtain better effects than the effect described above, but also there is a fear that the polyethylenimine coating the particles is likely to be altered or degraded.

Figure 2:
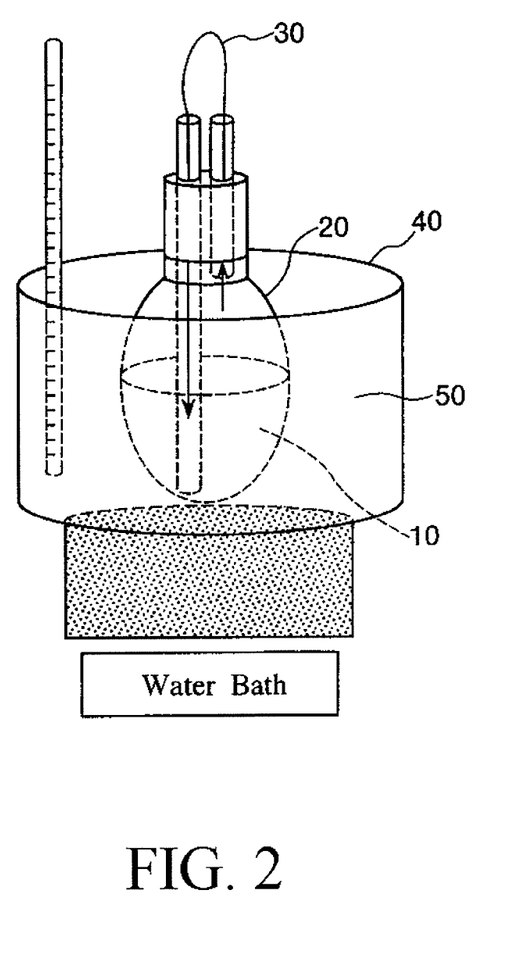
FIG. 2 is a view schematically showing one example of a reaction apparatus used for coating particles with a polyamine-based compound.

In this regard, it is preferred that a heating process of the reaction solution is performed as follows: As shown in FIG. 2, firstly, a reaction solution 10 is put into a closed container (reaction container) 2. Next, a gas which is generated by heating the reaction solution 10 is vacuumed outside the closed container 2. Thereafter, a circulation pathway 30 is formed so as to supply the gas again to the reaction solution 10. By the heating process, when the gas is supplied to the reaction solution 10, the reaction solution 10 is stirred, and therefore it is possible to accelerate the reaction between the hydroxyapatite and polyethylenimine. Furthermore, an alternative method other than the above heating method may be performed by putting a stirrer into the reaction container and heating the reaction solution while stirring the reaction solution by the stirrer.

Furthermore, it is preferred that the heating process of the reaction solution 10 is performed by using an aquarium 40 having heating means, and immersing the reaction container 20 into hot water 50 heated at a predetermined reaction temperature in the aquarium 40. This makes it possible to heat the reaction solution 10 within the temperature range as described above with good accuracy by using simple apparatus.

[S4: Step of Collecting Coated Particles]

In the step, the solvent and the non-reactive polyethylenimine are removed from the reaction solution which has been used in the step [S3]. Then, the coated particles in which the hydroxyapatite particles are coated with the polyethylenimine are collected.

To be concrete, in the case where the heating process of the reaction solution in the step [S3] is performed by using the closed container (reaction container) 20, the path of the circulation pathway 30 which supplies the gas to the reaction solution 10 is closed in a state that the reaction solution 10 is put into the reaction container 20. Then, a gas (vaporized solvent) generated from the reaction solution 10 is vacuumed and removed while heating the reaction solution 10. The heating process is completed at the time that the solvent included in the reaction container 20 is removed almost-totally.

The heating temperature is different depending on a kind of solvent. For example, in the case where methanol is used as the solvent, the heating temperature is preferably in the range of about 40 to 100° C., and more preferably in the range of 55 to 95° C. If the heating temperature is too low, a long period of time is required to remove the solvent, so that the manufacturing efficiency is lowered. On the other hand, if the heating temperature is too high, there is a fear that the reaction solution 10 is boiled suddenly, which is dangerous.

Next, the coated particles included in the reaction container 20 are placed on a filter, and then the coated particles are washed by passing distilled water through the filter and the coated particles. Thereafter, the coated particles are collected from the filter, and then they are dried by using a desiccator and the like.

It is preferred that the washing process of the coated particles is performed until when the distilled water, which has been passed through the filter and the coated particles, is reacted with the ninhydrin reagent to make sure a color reaction, the color reaction is not made sure. By doing so, it is possible to reliably remove the non-reactive polyethylenimine adhering to the coated particles. As a result, it is possible to prevent the adsorption capability and separation capability of the coated particles from being lowered and the adsorbed substance from being altered due to the remaining non-reactive polyethylenimine. In addition, when the coated particles are used as the adsorbent provided with the adsorption apparatus described later, it is possible to reliably prevent the polyethylenimine from being dissolved into an eluate.

By completing the processes as described above, it is possible to produce the coated particles in which the hydroxyapatite particles are coated with the polyethylenimine.

In the method of producing the coated particles described in this embodiment as described above, the hydroxyapatite particles are produced by using a general method. Then, the hydroxyapatite particles are coated with the polyethylenimine to obtain the coated particles. Thereafter, the coated particles are collected. The process of coating the particles with polyethylenimine can be performed with easy steps which include steps of mixing the particles, polyethylenimine and the solvent to prepare the reaction solution and heating the reaction solution. Furthermore, since the heating temperature of the reaction solution is a low temperature in the range of about 40 to 100° C., such processes can be performed by using a simple heating apparatus.

<Adsorption Apparatus>

Next, a description will be made on an adsorption apparatus (adsorption apparatus according to the present invention) in which the coated particles according to the present invention are used as an adsorbent.

FIG. 3 is a sectional view which shows one example of an adsorption apparatus in which the coated particles according to the present invention are used. It is to be noted that in the following description, the upper side and the lower side in FIG. 3 will be referred to as "inflow side" and "outflow side", respectively.

More specifically, the inflow side means a side from which liquids such as a sample solution (i.e., a liquid containing an adsorbed substance) and elution buffers (i.e., eluents) are supplied into the adsorption apparatus to separate (purify) a target adsorbed substance, and the outflow side means a side located on the opposite side from the inflow side, that is, a side through which the liquids described above discharge out of the adsorption apparatus.

The adsorption apparatus 4 shown in FIG. 3 includes a column 5, an adsorbent 1 using the particulate coated particles, and two filter members 6 and 7.

The column 5 is constituted from a column main body 51 and caps 52 and 53 to be attached to the inflow-side end and outflow-side end of the column main body 51, respectively.

The column main body 51 is formed from, for example, a cylindrical member. Examples of a constituent material of each of the parts (members) constituting the column 5 including the column main body 51 include various glass materials, various resin materials, various metal materials, and various ceramic materials and the like.

An opening of the column main body 51 provided on its inflow side is coated with the filter member 6, and in this state, the cap 52 is threadedly mounted on the inflow-side end of the column main body 51. Likewise, an opening of the column main body 51 provided on its outflow side is coated with the filter member 7, and in this state, the cap 53 is threadedly mounted on the outflow-side end of the column main body 51.

The column 5 having such a structure as described above has an adsorbent filling space 56 defined by the column main body 51 and the filter members 6 and 7, and at least a part of the adsorbent filling space 56 is filled with the adsorbent 1 constituted of the coated particles according to the present invention (in this embodiment, almost the entire of the adsorbent filling space 56 is filled with the adsorbent 1).

A volumetric capacity of the adsorbent filling space 56 is appropriately set depending on the volume of a sample solution to be used and is not particularly limited, but is preferably in the range of about 0.05 to 10 mL, and more preferably in the range of about 0.5 to 2 mL per 1 mL of the sample solution.

By setting a size of the adsorbent filling space 56 to a value within the above range and by setting a size of the coated particles to a value within the range as described above, it is possible to reliably separate various kinds of adsorbed substances from each other.

Further, liquid-tightness between the column main body 51 and the caps 52 and 53 is ensured by attaching the caps 52 and 53 to the column main body 51.

An inlet pipe 54 is liquid-tightly fixed to the cap 52 at substantially the center thereof, and an outlet pipe 55 is also liquid-tightly fixed to the cap 53 at substantially the center thereof. The liquids described above are supplied to the adsorbent filling space 56 through the inlet pipe 54 and the filter member 6. The liquids supplied to the adsorbent filling space 56 pass through gaps between the coated particles and then discharge out of the column 5 through the filter member 7 and the outlet pipe 55. At this time, since the average particle size of the coated particles is 1 µm or more, enough gaps to allow the liquids to flow are formed between the coated particles. Therefore, it is possible to prevent the liquids from easily flowing between the coated particles and from remaining in the column main body 51. In the process that the liquids pass through the column main body 51, the coated particles have superior absorption capability with respect to both the substance having the negative electric charge and the substance having the positive electric charge. Therefore, the various kinds of adsorbed substances contained in the sample solution (sample) are reliably separated based on a difference in degree of adsorption of each of the adsorbed substances to the coated particles and a difference in degree of affinity of each of the adsorbed substances to the buffer.

Each of the filter members 6 and 7 has a function of preventing the coated particles from discharging out of the adsorbent filling space 56. Further, each of the filter members 6 and 7 is formed of a nonwoven fabric which is made of a synthetic resin such as polyurethane, polyvinyl alcohol, polypropylene, polyetherpolyamide, polyethylene terephthalate, or polybutylene terephthalate, a foam (a sponge-like porous body having communicating pores), a woven fabric, a mesh or the like.

Since the average particle size of the coated particles according to the present invention is 1 µm or more, an average pore size of each of the filter members 6 and 7 may be 1 µm or less, but is preferably in the range of about 0.2 to 0.8 µm.

Therefore, in the adsorption apparatus 4 in which the coated particles are provided as the adsorbent 1, it is possible to reliably prevent clogging, which is likely to be generated due to that the coated particles enter pore portions of the filter members 6 and 7, from occurring and the coated particles from being discharged by passing through the filter members 6 and 7.

In the absorption apparatus configured as described above, the coated particles have the superior absorption capability with respect to both the substance having the negative electric charge and the substance having the positive electric charge. Therefore, the various kinds of substances are adsorbed to the coated particles by mainly electrostatic interaction. As a result, the various kinds of substances can be separated based on a difference in degree of adsorption of each of the substances to the adsorbent 1 and a difference in degree of affinity of each of the substances to the buffer. In other words, it is possible to reliably separate and collect both the substance having the negative electric charge and the substance having the positive electric charge contained in the sample solution.

Furthermore, the various kinds of adsorbed substances can be separated with good separation capability by changing a salt concentration of the elution buffer in a consecutive or stepwise manner. Therefore, the present invention can solve a problem in that the substance having the negative electric charge is dissolved to the eluate early.

In a case where almost the entire of the adsorbent filling space 56 is filled with the coated particles as in the case of this embodiment, the coated particles preferably has substantially the same composition at every point in the adsorbent filling space 56. This makes it possible to allow the adsorption apparatus 4 to have a particularly excellent ability to separate (purify) the various kinds of adsorbed substances.

In this regard, it is to be noted that the adsorbent filling space 56 may be partially filled with the coated particles (e.g., a part of the adsorbent filling space 56 located on its one side where the inlet pipe 54 is provided may be filled with the coated particles). In this case, the remaining part of the adsorbent filling space 56 may be filled with another adsorbent.

Next, a method of separating adsorbed substances using the adsorption apparatus 4 described above will be described.

(1) Preparation Step

First, a sample containing various kinds of adsorbed substances and a buffer are mixed to prepare a sample solution.

A concentration of a salt contained in the buffer to be used for preparing the sample solution is preferably equal to or lower than that of an elution buffer which will be described later. This makes it possible to reliably adsorb the adsorbed substances to the coated particles filled to the adsorbent filling space 56 as the adsorbent 1.

An amount of the buffer to be used for preparing the sample solution is not particularly limited, but is preferably in the range of about 5 to 300 times, and more preferably in the range of about 50 to 150 times with respect to the mass of the adsorbed substances.

A pH of the buffer is different depending on a kind of the adsorbed substances contained in the sample solution. For example, in the case where the adsorbed substances are the biologically-relevant substance such as proteins, nucleotides, nucleic acid and the like, the pH is preferably in the range of about 6 to 8, and more preferably in the range of about 6.5 to 7.5.

A temperature of the buffer is not particularly limited, but is preferably in the range of about 20 to 50° C., and more preferably in the range of about 25 to 45° C.

By using the buffer having the pH within the above range and the temperature within the above range, in the case where the adsorbed substances are the biologically-relevant substance, it is possible to reliably suppress the biologically-relevant substance from being altering, thereby efficiently adhering the biologically-relevant substance to the coated particles. As a result, it is possible to improve a yielding (collection) ratio of a target adsorbed substance.

It is to be noted that in the case where the thus prepared sample solution contains solid matters, the solid matters are preferably removed from the sample solution. By doing so, it is possible to reliably prevent clogging of the column 5. A method of removing the solid matters is not particularly limited. For example, the sample solution may be centrifuged to obtain a supernatant. In this case, the obtained supernatant is collected, and then the solid matters remaining in the supernatant is further removed by filtration using a filter.

(2) Supplying Step

Next, the sample solution is supplied to the adsorbent filling space 56 through the inlet pipe 54 and the filter member 6 to be in contact with the adsorbent (coated particles) 1 and to pass through the column 5 (adsorbent filling space 56).

As a result, components having low adsorption capability to the coated particles are discharged out of the column 5 through the filter member 7 and the outlet pipe 55. On the other hand, components having high adsorption capability to the coated particles are retained to the coated particles in the adsorbent filling space 56 of the column 5.

(3) Fractionation Step

Next, an elution buffer (eluant) is supplied into the adsorbent filling space 56 (column 5) through the inlet pipe 54 to elute the adsorbed substances, and thereby an eluate containing the elution buffer and the adsorbed substances can be obtained. Thereafter, the eluate discharged out of the column 5 through the outlet pipe 55 is fractionated (collected) to obtain fractions corresponding to the eluate each having a predetermined amount.

In this embodiment, a concentration of a salt (salt concentration) contained in the elution buffer is changed in a consecutive or stepwise manner. In this regard, it is to be noted that the elution buffer is preferably one of the same kind as that of the buffer used in the preparation step described above.

In the case where the various kinds of adsorbed substances are adsorbed to the coated particles, when the elution buffer is brought into contact with the coated particles, the adsorbed substances having low adsorption capability to the coated particles are first desorbed from the coated particles, and then discharged through the outlet pipe 55. Then, other adsorbed substances adsorbed to the coated particles are desorbed from the coated particles depending on the salt concentration of the elution buffer in a degree order of the adsorption capability thereof. The adsorbed substances desorbed from the coated particles are mixed with the elution buffer to obtain an eluate, and then the adsorbed substances are collected from the eluate discharged through the outlet pipe 55. At this time, by fractionating the eluate discharged through the outlet pipe 55 into fractions each having a predetermined amount, it is possible to separate a specific adsorbed substance from the sample solution containing the various kinds of adsorbed substances.

Here, an electric charge state of the coated particles, namely the adsorption capability to the adsorbed substance can be controlled by changing the coating amount of the polyamine-based compound. Therefore, for example, in the case where the coating amount of the polyamine-based compound is set according to the adsorption capability of the coated particles to the adsorbed substance to be collected, it is possible to improve the yielding ratio of the adsorbed substance.

Furthermore, in the case where the coating amount of the polyamine-based compound is set so as to obtain a large difference between the adsorption capability of the coated particles to the adsorbent substance to be collected and the adsorption capability of the coated particles to other adsorbed substances, it is possible to obtain a large difference between an elution time of the adsorbent substance to be collected and an elution time of the other adsorbed substances. As a result, a specific adsorbent substance can be separated from the sample solution containing the various kinds of adsorbed substances with good separation capability.

A flow rate at which the elution buffer flows in adsorbent filling space 56 of the column 5 is not particularly limited, but is preferably in the range of about 1 to 10 mL/min, and more preferably in the range of about 1 to 5 mL/min.

A flow time at which the elution buffer flows in adsorbent filling space 56 of the column 5 is not particularly limited, but is preferably in the range of about 5 to 60 minutes, and more preferably in the range of about 10 to 30 minutes.

Although the coated particles, the method of producing the coated particles and the adsorption apparatus according to the present invention have been described above, the present invention is not limited thereto.

For example, the configuration of each part of the coated particles and the adsorption apparatus according to the present invention can be replaced with an arbitrary configuration which can exhibit the same function as that of the above configuration. In addition, an arbitrary configuration can be added to the above configuration.

Furthermore, the method of producing the coated particles according to the present invention may further include one or more steps for any purpose.

Next, a description will be made on concrete examples according to the present invention.

1. Production of Particles

Example 1

First, a dispersion liquid was prepared by dispersing sodium hydroxide of 140 g in pure water of 1200 mL. A phosphoric acid aqueous solution (a concentration of phosphoric acid was 10 wt %) of 700 mL was dropped into the dispersion liquid with stirring it. By doing so, the sodium hydroxide was reacted with the phosphoric acid to synthesize hydroxyapatite, thereby obtaining a slurry containing aggregates of the hydroxyapatite.

Next, particles of the hydroxyapatite (Hap particles having an average particle size of 40 μm) was obtained by spray-drying the slurry.

Next, a polyethylenimine solution was prepared by dissolving a 30 wt % polyethylenimine (MW 70000) solution of 10 g to methanol of 50 mL.

Then, the obtained hydroxyapatite particles of 10 g was mixed with the obtained polyethylenimine solution of 5 mL and further methanol of 100 mL to obtain a particles-polyethylenimine reaction solution (hereinafter, simply referred to as "reaction solution").

Next, the reaction solution was put into a reaction container having a circulation pathway. Then, the reaction container was heated for 15 minutes by immersing it into hot water of 70° C. By doing so, the hydroxyapatite constituting the particles was reacted with polyethylenimine to coat the hydroxyapatite particles with polyethylenimine. At this time, after a gas generated from the reaction solution was vacuumed outside the reaction container through the circulation pathway, a reaction system was set so as to supply the gas into the reaction solution again.

Next, a path to supply the gas to the reaction solution, which was included the circulation pathway, was closed. Thereafter, the gas (vaporized solvent) generated from the reaction solution was vacuumed and removed in a state that the reaction container was immersed into the hot water of 70° C. The heating process was completed at the time that the solvent included in the reaction container was removed almost-totally.

Next, the particles included in the reaction container were placed on a filter, and then the particles are washed by passing distilled water through the filter and the particles. The washing process of the particles was performed until when the distilled water, which has been passed through the filter and the particles, was reacted with the ninhydrin reagent to make sure a color reaction, the color reaction was not made sure.

Thereafter, the particles were collected from the filter, and then they were dried by using a desiccator.

By completing the above processes, particles in which the hydroxyapatite particles were coated with polyethylenimine (coated particles: PEI-HAp particles) were obtained.

In this particles, a coating amount of polyethylenimie was measured by a method of using the CBB reagent. As a result, the coating amount was 5.99 mg/g.

Example 2

Particles (coated particles: PEI-HAp particles) were obtained in the same manner as the Example 1 except that water was used instead of methanol as the solvent to prepare the particles-polyethylenimine reaction solution.

In this particles, a coating amount of polyethylenimie was measured by the method of using the CBB reagent. As a result, the coating amount was 5.29 mg/g.

Comparative Example

Particles (HAp particles) were obtained in the same manner as the Example 1 except that the process of coating the particles with polyethylenimine was omitted.

In this particles, a coating amount of polyethylenimine was measured by the method of using the CBB reagent. As a result, the polyethylenimine was not detected, that is, the coating amount was 0.

2. Evaluation 2-1. Examination of Elution Pattern of Protein

The particles produced in each of the Example 1 and the Comparative Example were filled into a column (40×100 mm).

On the other hand, Ovalbumin (Ova) of 10 mg/g, Myoglobin (Myo) of 5 mg/g, α-Chymotrypsinogen-A (α-Chymo) of 5 mg/g and Cytochrome-C (Cyto) of 5 mg/g were dissolved into a sodium phosphate buffer of 10 mM (pH 6.8) to prepare a protein solution as a sample solution.

The protein solution was supplied into the column at a speed of 1.0 mL/min. Thereafter, the sodium phosphate buffer of 10 mM (pH 6.8) was supplied into the column for 1 minute at a speed 1.0 mL/min.

Next, the sodium phosphate buffer (pH 6.8) was supplied into the column for 15 minutes so that a concentration of the sodium phosphate buffer was changed from 10 mM to 400 mM in a stepwise manner. Thereafter, the sodium phosphate buffer (pH 6.8) of 400 mM was supplied into the column for 5 minute.

Then, an eluate was discharged from the column. The eluate was subjected to an ultraviolet detector at a wavelength of 280 nm to obtain an absorbance curve. The thus obtained absorbance curve was shown in FIGS. 4 and 5.

Figure 4:
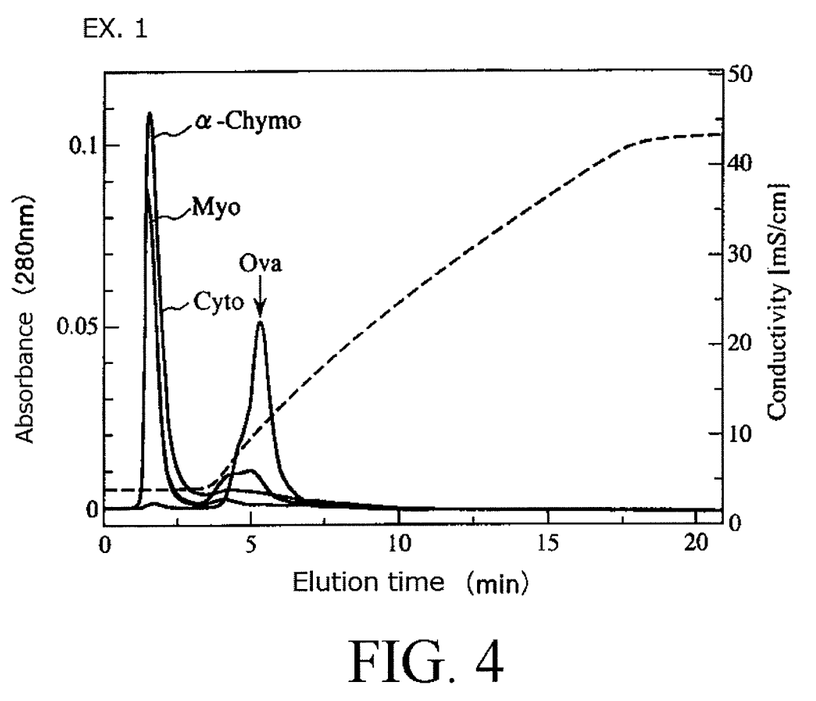
FIG. 4 is an absorbance curve of an eluate discharged from a column using coated particles (PEI-HAp particles) produced in the Example 1 after various kinds of proteins and an eluante are supplied to the column.
Figure 5:
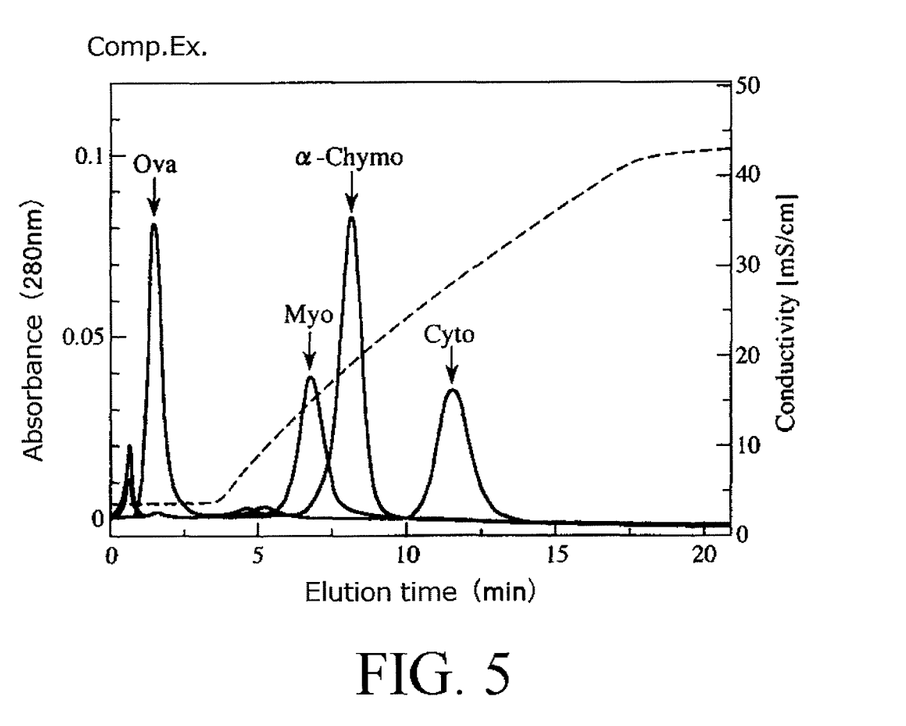
FIG. 5 is an absorbance curve of an eluate discharged from a column using particles (HAp particles) produced in the Comparative Example after various kinds of proteins and an eluante are supplied to the column.

As seen from FIGS. 4 and 5, peaks corresponding to Ovalbumin, Myoglobin, α-Chymotrypsinogen-A and Cytochrome-C were observed in the absorbance curve obtained by using each of the columns. However, the elution pattern of these proteins in the absorbance curve shown in FIG. 4 was different from the elution pattern of these proteins in the absorbance curve shown in FIG. 5.

In other words, as shown in FIG. 5, in the column using the particles (HAp particles) produced in the Comparative Example, the proteins included in the sample solution, namely Ovalbumin, Myoglobin, α-Chymotrypsinogen-A and Cytochrome-C were eluted in this order. In contrast, as shown in FIG. 4, in the column using the particles (PEI-HAp particles) produced in the Example 1, Myoglobin, α-Chymotrypsinogen-A and Cytochrome-C were eluted at the substantially same elution time. And only Ovalbumin was eluted at a later time than those of other proteins.

From these results, it found that the elution pattern of the proteins, which was obtained by using the column using the coated particles as an adsorbent, was changed by coating the hydroxyapatite particles with polyethylenimie. Particularly, in the column using the particles (PEI-HAp particles) produced in the Example 1, the elution time of Ovalbmin (acid protein) was late. Therefore, it found that the adsorption capability of the coated particles to the acid protein was improved, and an ability of separating the acid protein from other proteins (separation capability to the acid protein) was improved.

2-2. Examination of Elution Pattern of Nucleotide

The particles produced in each of the Examples 1 and 2 the Comparative Example were filled into a column (40×100 mm).

On the other hand, an AMP of 5 mg/mL, an ADP of 5 mg/mL and an ATP of 5 mg/mL were dissolved into a sodium phosphate buffer of 10 mM (pH 6.8) to prepare a nucleotide solution as a sample solution.

The nucleotide solution was supplied into the column at a speed of 1.0 mL/min. Thereafter, the sodium phosphate buffer of 10 mM (pH 6.8) was supplied into the column for 1 minute at a speed 1.0 mL/min.

Next, the sodium phosphate buffer (pH 6.8) was supplied into the column for 15 minutes so that a concentration of the sodium phosphate buffer was changed from 10 mM to 400 mM in a stepwise manner. Thereafter, the sodium phosphate buffer (pH 6.8) of 400 mM was supplied into the column for 5 minutes.

Then, an eluate was discharged from each column. The eluate was subjected to an ultraviolet detector at a wavelength of 260 nm to obtain an absorbance curve. The thus obtained absorbance curve was shown in each of FIGS. 6 to 8.

Figure 6:
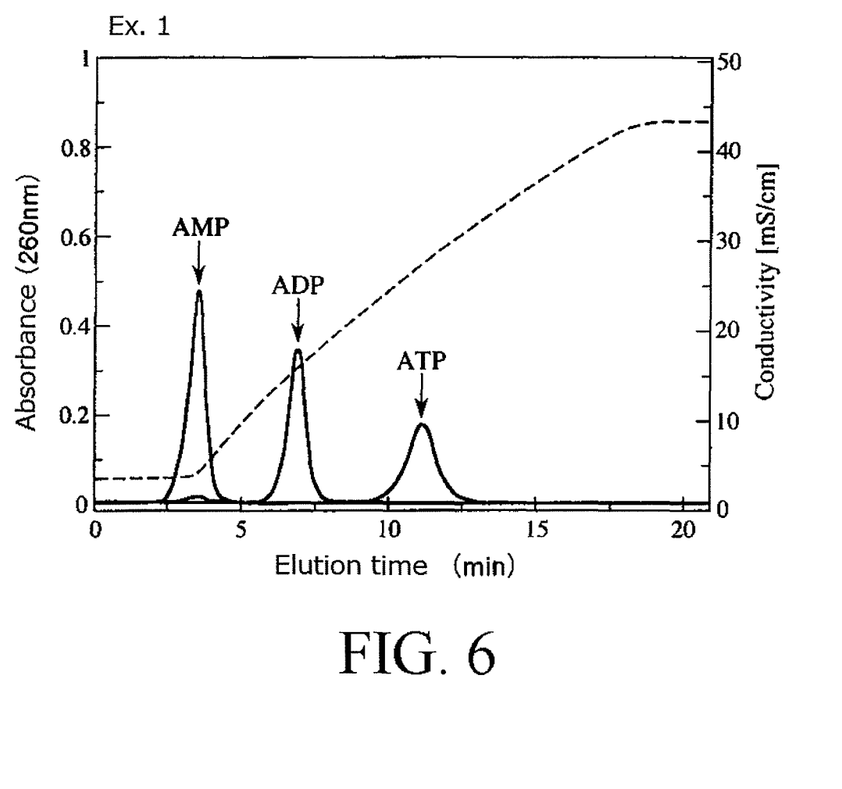
FIG. 6 is an absorbance curve of an eluate discharged from a column using coated particles (PEI-HAp particles) produced in the Example 1 after various kinds of nucleotides and an eluante are supplied to the column.
Figure 7:
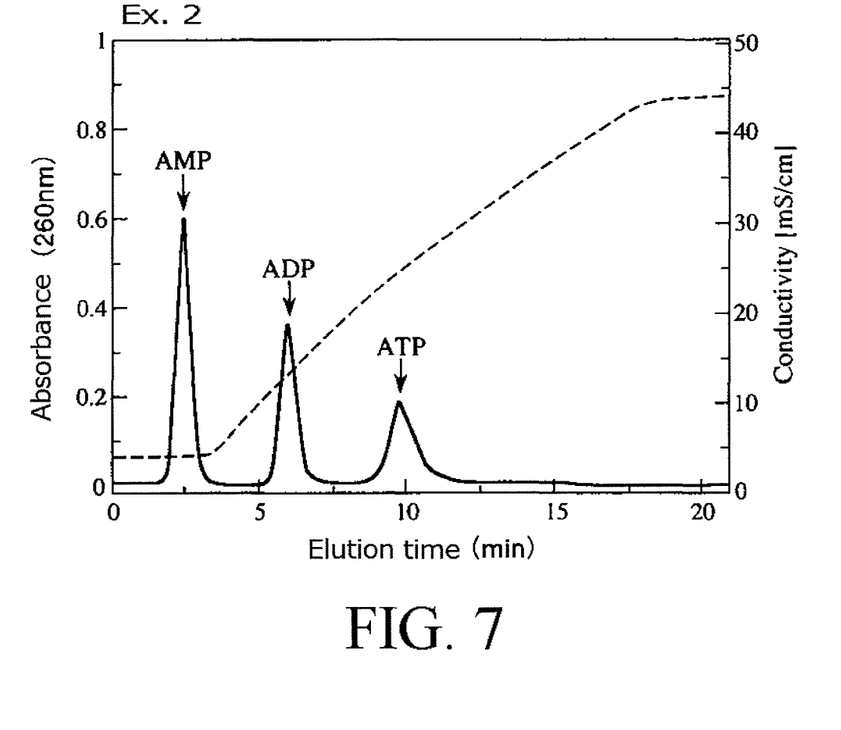
FIG. 7 is an absorbance curve of an eluate discharged from a column using coated particles (PEI-HAp particles) produced in the Example 2 after various kinds of nucleotides and an eluante are supplied to the column.
Figure 8:
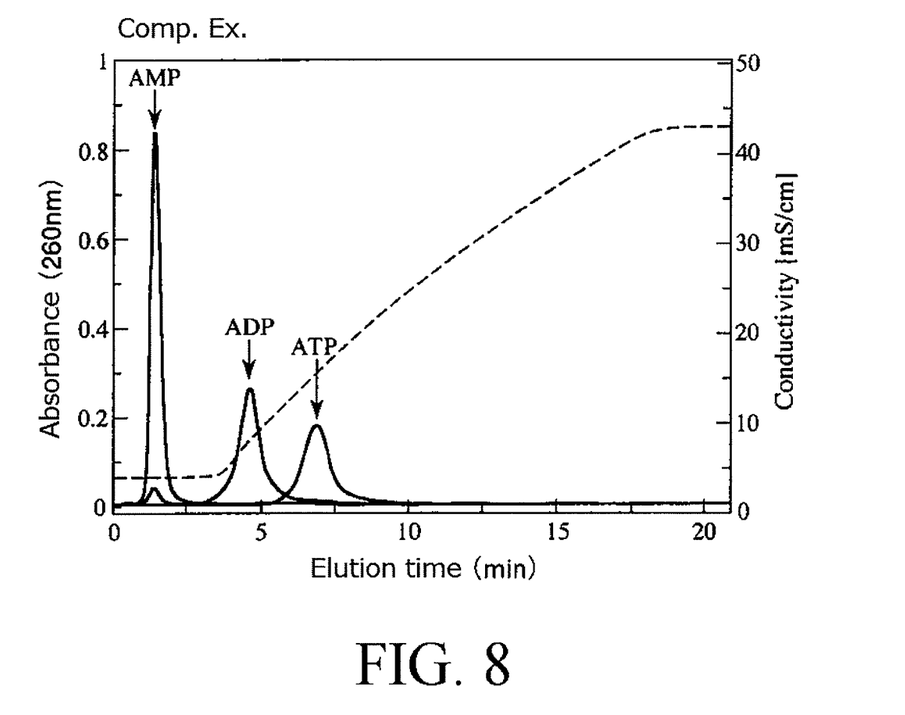
FIG. 8 is an absorbance curve of an eluate discharged from a column using particles (HAp particles) produced in the Comparative Example after various kinds of nucleotides and an eluante are supplied to the column.

As seen from FIGS. 6 to 8, peaks corresponding to the AMP, ADP and ATP were observed in the absorbance curve obtained by using each of the columns in this elution order. However, it found that the elution time of the nucleotide was late in the column using the particles (PEI-HAp particles) produced in the Example 1, the column using the particles (PEI-HAp particles) produced in the Example 2, and the column using the particles (HAp particles) produced in the Comparative Example in these columns order. In addition, it found that differences among the elution times of AMP, ADP and ATP were long in these columns order described above.

From these results, it found that the separation capability of the nucleotide, which was obtained by using the column using the coated particles as the adsorbent, was improved by coating the hydroxyapatite particles with polyethylenimie. Furthermore, differences among the elution times of AMP, ADP and ATP in the absorbance curve obtained by using the column using the particles (methanol was used as the solvent of the reaction solution) produced in the Example 1 were longer than those in the absorbance curve obtained by using the column using the particles (water was used as the solvent of the reaction solution) produced in the Example 2. From this result, it found that by using methanol as the solvent of the reaction solution, it was possible to obtain particles having more superior separation capability.

Particles (PEI-HAp particles) were produced by using ethanol or isopropyl alcohol instead of methanol as the solvent of the reaction solution for coating the particles with polyethylenimine. Thereafter, the evaluation was performed in the same manner as described above. The results were the same as those of the case where the particles (PEI-HAp particles) were produced by using water as the solvent of the reaction solution. From these results, it found that methanol was preferable as the solvent of the reaction solution for coating the particles with polyethylenimine.

INDUSTRIAL APPLICABILITY

In particles of which at least the vicinity of the surfaces is constituted of the calcium phosphate-based compound, there is a problem in that an amount of the positive electric charge by the calcium ions is lower than that of the negative electric charge by the phosphate groups. However, according to the present invention, since the amount of the positive electric charge of the coated particles can be set to a large amount, it is possible to obtain coated particles having superior adsorption capability and separation capability regardless of an electric charge state of an adsorbed substance.

Furthermore, if methanol is used as a liquid contained in the preparing solution used for producing the coated particles, it is possible to efficiently react the calcium phosphate-based compound with the polyamine-based compound. As a result, it is possible to reliably improve a coating ratio of the particles of which at least the vicinity of the surfaces is constituted of the calcium phosphate-based compound with the polyamine-based compound. Accordingly, the present invention has industrial applicability.

What is claimed is:

1. Coated particles comprising: particles each having a surface, and at least the vicinity of the surface being constituted of a calcium phosphate-based compound having phosphate groups and calcium;

wherein at least a part of the surface of each of the particles is coated with a polyamine-based compound having amino groups and a network structure represented by the following chemical formula where "n" is an integer of 1 or more, and an average particle size of the particles is 1 μm or more, and wherein at least a part of the amino groups is bonded to the phosphate groups, and at least the calcium, the phosphate groups and the amino groups are exposed to the surface of each of the particles and an amount of the calcium exposed to the surface is lower than an amount of the phosphate groups exposed to the surface, so that the coated particles have adsorption capability with respect to both a substance having negative electrical charge in the calcium and the amino groups and a substance having positive electrical charge in the phosphate groups.

2. The coated particles as claimed in claim 1, wherein the average particle size of the particles is in the range of 2 to 200 μm.

3. The coated particles as claimed in claim 1, wherein the polyamine-based compound includes polyethylenimine.

4. The coated particles as claimed in claim 3, wherein an average molecular weight of the polyethylenimine is in the range of 800 to 100000.

5. The coated particles as claimed in claim 3, wherein a coating amount of the polyethylenimine is in the range of 0.1 to 100 mg with respect to 1 g of the particles.

6. The coated particles as claimed in claim 1, wherein the calcium phosphate-based compound is hydroxyapatite.

7. An adsorption apparatus provided with the coated particles defined in claim 1 as an adsorbent.

8. A method of producing coated particles according to claim 1, comprised of particles each having a surface, and at least the vicinity of the surface of the particle being constituted of a calcium phosphate-based compound, wherein the particles are coated with a polyamine-based compound, and an average particle size of the particles is 1 μm or more, and the method comprising:
    preparing a preparation liquid containing a liquid containing at least one of water and an alcohol, the coated particles and the polyamine-based compound;
    heating the preparation liquid to coat the particles with the polyamine-based compound.

9. The method as claimed in claim 8, wherein the calcium phosphate-based compound is hydroxyapatite.

10. The method as claimed in claim 8, wherein a temperature of the preparing liquid in heating the preparing liquid is in the range of 40 to 100° C.

11. The method as claimed in claim 8, wherein the preparing the preparation liquid includes:
    mixing the polyamine-based compound with the liquid to obtain a first mixture; and
    adding the particles into the first mixture to disperse the particles to obtain the preparation liquid.

12. The method as claimed in claim 11, wherein after the adding the particles into the first mixture, the preparing the preparation liquid further includes adding the liquid into the preparation liquid.

13. The method as claimed in claim 8, wherein the liquid contains methanol as a main component thereof.

14. The method as claimed in claim 13, wherein an amount of the methanol contained in the liquid is 50 wt % or more.

15. The method as claimed in claim 8, wherein the polyamine-based compound includes polyethylenimine.

16. The method as claimed in claim 15, wherein a weight ratio between the particles and the polyethylenimine contained in the preparing liquid is in the range of 500:1 to 10:1.

* * * * *